Nov. 6, 1923. 1,473,206
H. S. CASSEL
BEARING LINE FOR ELECTRIC AERIAL CONDUCTORS TO AUTOMOBILE MACHINES
Filed Sept. 21, 1922
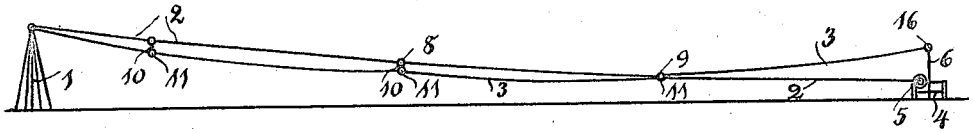
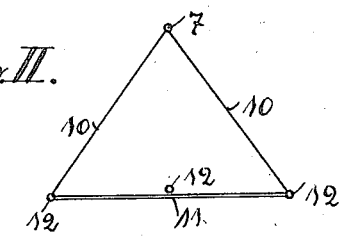
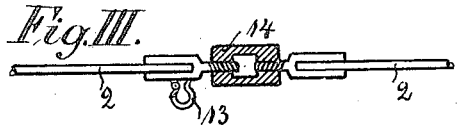
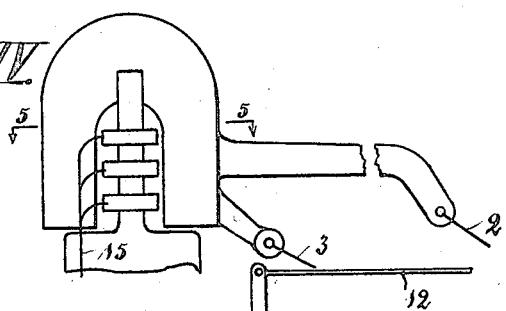
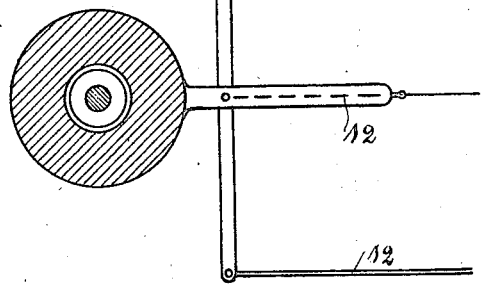
Hjalmar Sigfrid Cassel
INVENTOR;
By *Otto Munk*
His Attorney Patented Nov. 6, 1923.

1,473,206

UNITED STATES PATENT OFFICE.

HJALMAR S. CASSEL, OF STOCKHOLM, SWEDEN.

BEARING LINE FOR ELECTRIC AERIAL CONDUCTORS TO AUTOMOBILE MACHINES.

Application filed September 21, 1922. Serial No. 589,711.

*To all whom it may concern:*

Be it known that I, HJALMAR SIGFRID CASSEL, a citizen of Sweden, residing at Stockholm, Sweden, have invented certain new and useful Improvements in Bearing Lines for Electric Aerial Conductors to Automobile Machines, of which the following is a specification.

The present invention refers to bearing line for electric aerial conductor to automobile machines. In the electric transmission of power to automobile machines, especially for agricultural purposes (tractors, etc.), an aerial conductor extended from a distribution mast erected on the field to a mast erected on the machine,—whether automatically regulated by a so-called regulator, which according to requirements, winds up or unwinds the wire from one or more regulator wheels (winches), or stretched by weights or otherwise,—has been found to be serviceable so long as the distances are not too great. For agricultural purposes, however, it is of great importance to be able to use large spans, particularly in so-called "circular driving," where the machine travels continuously round a centrally placed distribution mast. The area in fact increases with the square of the extension distance; the outer area is more valuable, as the turns made by the machine in proportion to the work increase in number the nearer one gets to the centre.

As the best conducting metals and alloys have not sufficient tensile strength for the large spans required and the consequent high tension, an arrangement whereby the strain on the conducting metals can be diminished will be of great importance. Endeavours have been made to attain this object by reinforcing the conducting elements or divisions between connections with wires or ribbons of steel. This arrangement however, augments the difficulty of bending the line, whether it is wound up or runs through blocks, etc. The winding up of a line up to 300 metres in length involves in itself great practical difficulties, as the dimensions of the winch will be cumbrous. Solid metal-cord (wire) cannot be bent without great resistance and steel ribbons or wires have much less tensile strength relatively to the area or weight per unit, and thus have to be made thicker. As the reduction of the weight of an aerial conductor wire is a primary consideration, the drawbacks of the arrangement just referred to will be realized.

Another great drawback is attendant on the hitherto known systems for this kind of power transmission. By extending the wire from the top of a mast or pole erected on the machine (tractor etc.), the wire is exposed to violent swinging, shocks, or vibrations, as the movements of the machine are increased at the top of the mast. This gives rise to frequent ruptures of the line, which cause the greatest inconvenience.

The present invention is intended to overcome these drawbacks by facilitating the electric transmission of power to automobile machines at great distances, and thus enhancing the practical utility of electric operation in agriculture. It is especially well adapted for circular driving, which as a rule entails great advantages, as empty running and turning plots are thus avoided, and for certain agricultural purposes, as for instance in the use of harvesters, it is the only practicable method. It is to be particularly noted that the invention is not confined to aerial conductors with automatic regulation, as in many cases such regulation is not necessary in circular driving.

The invention consists of the following devices:

A bearing line (wire or rope) of great tensile strength, which may be suitably made of special steel, is extended from the distributing mast preferably a firm pole erected centrally in the area of operation, and preferably connected to the main line by an earth-conduit, to the automobile machine, being attached to the latter (or fed in and out) low enough to obviate dangerous swingings. If a regulator is employed, it may be mounted either on the distribution mast, or on the automobile machine; the latter method is advantageous, as the regulator can then be driven by the motor of the machine. The object of the bearing line is to support and partly to carry the electric line. The bearing line also may be conductive, but it should preferably be connected with a zero phase connected to earth. Its exposed situation, low down on the machine, generally precludes its use for dangerous current. The electric conductor, on the other hand, ought to be placed high at the top of the mast of the automobile machine. This is an arrangement of the electric conductor at a high point on the machine relative to the attachment of the bearing line on which a patent is herewith applied for, and is connected with the fact that the bearing line is separate from the electric line and extended independently: thus in case a regulator is used, it has a regulator wheel of its own. The electric line is connected to (or suspended on) the bearing line at one or more points (so-called points of junction), and its total distance is thus divided into two or more spans. The suspension may be effected by means of cords (preferably of insulating material, silk, flax, or the like), which mode of suspension is especially suitable when it is desired to fix the positions of the divisions. In accordance with the invention it is possible to combine the two or three divisions (lines, ribbons, wires etc.) of the electric line whilst preventing their joining (each other).

If one or more cross ties are arranged on the electric wire, for example rods of light insulating materials (e. g. bamboo-canes) attached to lines parallel and sufficiently separated, such a tie may be suspended by two or more cords (hangers) preferably of insulating material, such as silk, flax, hemp, etc., at a point of junction on the bearing line. As the bearing line on the machine is fastened (or suspended) lower than the electric line, the bearing line will cross the electric line at a certain point. At this point the tie should be fastened to the bearing line direct; if there are three divisions, the zero-phase line should suitably be in the middle, and can then be connected direct without insulation at the said point to the bearing line.

In round driving it will not always be necessary to coil up the bearing line and conducting line. It is conceivable that the machine may travel in a circle with the electric and bearing lines tightened, and that at each new revolution both may be shortened by some practical method. If the driving is in a spiral, it is conceivable that the electric and bearing lines may be successively laid over wheels placed in the centre with the same periphery as the working breadth of the machine. Usually, however, the working fields are square, and so-called square driving (ploughing) etc., often with bevelled or rounded corners, is practised. In this case an automatic regulation of line and wire is desirable. As the points of junction and ties which constitute features of the present invention preclude complete rolling up, only part of the electric and bearing lines, viz, that which lies nearest to the respective regulator and between the latter and the nearest point of junction, is coilable. The remaining parts may thus be made of material which is not adapted for repeated bending, such as a stiff, solid cord. As a rule, the coilable part constitutes only a certain part of the entire length, for example one-fifth or one-sixth, and is then made of flexible wire or ribbon. If there are several points of junction, it is advantageous that each part of the bearing line between the points, or each part of the electric line between ties suspended on or fastened to the bearing line, should be made free, so that they can readily be detached. This is effected in the most simple manner by screwing the parts together as shown in Figure III; as regards the bearing-line even, if it is not intended to be conductant, a simple hooking device may be employed. Joint after joint of the bearing and conducting lines is uncoupled according to requirements, and each such joint should be shorter than the part coiled. These arrangements are obviously essential conditions for the extensive use of the invention and thus constitute features of the patent.

Forms of the devices on which a patent is applied for are illustrated in Figs. I-V. Fig. I shows a diagrammatic view of an aerial conductor supported by a bearing-line. At the top of a distribution mast 1 are rotatably fastened first the bearing-line 2 and secondly the electric line 3, the former extended on a machine 4 working on the field by means of a regulator wheel 5, which is placed fairly close to the ground, the latter line 3 being drawn to a regulator 16 at the top of a mast 6 placed on the machine, and being supported by the attachments of three points of junction 7—9 on the bearing-line. At two of these points of junction 7, 8, the conducting line is suspended between hangers 10 at the point of junction; at the point of junction 9 nearest to the machine the conducting line is directly fastened to the bearing-line. Fig. II illustrates a hanger device, comprising a tie 11, consisting of a light rod (bamboo) to which are fastened three division or bearing lines 12, the central one of which is a zero line. The rod 11 is suspended by two hangers 10 at a point of junction, 7 on the bearing line 12. Fig. III illustrates the juncture of two parts of a bearing line 2 at a point of juncture 7. The one part of the bearing line is firmly united with the point of junction, to which the hanger can be hooked, by the safety hook 13. The other part is firmly screwed by a right and left threaded muff 14. The parts of the conducting wire at the tie rod 11 are fastened in a similar manner. Figs. IV-V show the fastening to the distribution mast, Fig. IV in side view, Fig. V from above. The three phases of the circuit line are connected in a known manner by a rotary phase converter with the main line 15, which passes through the hollow distribution mast.

Fig. I shows that the conducting line is divided into three spans, and that the strain on the weaker material in the line (e. g. aluminium) is thus inconsiderable compared with the tension of the directly extended bearing line, which is made of special steel.

Claims:

1. An electric aerial conductor to an electrically driven automobile machine, a bearing-line independently extended from a mast erected on the field to the machine, for the purpose of supporting the said aerial conductor, the bearing-line being fastened (or suspended) on the machine lower than the aerial conductor devices for connecting the electric line at one or more points, so-called points of junction, to the bearing-line.

2. An electric aerial conductor to an electrically driven automobile machine, a bearing line independently extended from a mast erected on the field to the machine, for the purpose of supporting the said air-line, the bearing-line being fixed or suspended on the machine lower than the air-line, devices for connecting the electric line at one or more points, so-called points of junction, to the bearing-line, the said devices consisting of hangers in which tie elements connecting the divisions of the line are suspended.

3. An electric aerial conductor to an electrically driven automobile machine, a bearing line independently suspended from a mast erected on the field to the machine for the purpose of supporting the said air-line, the bearing-line being fastened or suspended on the machine lower than the air-line, devices for the connection of the electric line at one or more points, so-called points of junction, to the bearing-line, the said devices consisting of hangers in which tie elements connecting the divisions of the line are suspended, the bearing-line and electric line being detachable in parts which can be removed as the work proceeds.

4. An electric aerial conductor to an electrically driven automobile machine, a bearing-line independently extended from a mast erected on the field to the machine, for the purpose of supporting the said air-line, the bearing-line being fastened (or suspended) on the machine lower than the air-line-devices for connecting the electric line at one or more points so-called points of junction, to the bearing-line, the said devices consisting of hangers in which tie elements connecting the divisions of the line are suspended, the bearing line and the electric line being easily detachable in parts which can be removed gradually as the work proceeds, the tie elements consisting of a rod of non-conducting material, the divisions of the line being fastened to the said rod at a distance sufficient to preclude contact of the hanging parts, the tie rod nearest to the machine being directly fastened to the bearing-line, the said hangers consisting of lines (cords, ribbon etc.) in which the said tie rod is suspended in a constant horizontal or approximately horizontal position.

5. An electric aerial conductor to an electrically driven automobile machine, a bearing-line independently suspended from a mast erected on the field to the machine, for the purpose of supporting the said air-line, the bearing-line being fastened (or suspended) on the machine lower than the air-line, devices for connecting the electric line at one or more points, so-called points of junction, to the bearing-line, the said devices consisting of hangers in which tie elements connecting the divisions of the line are suspended, the bearing-line and the electric line being easily detachable in parts, which can gradually be removed as the work proceeds, the tie elements consisting of a rod of non-conducting material, the divisions of the line being connected to the said rods at a distance sufficient to preclude the contact of the hanging parts, the tie rod nearest the machine being directly fastened to the bearing-line the said hangers consisting of lines (cords, ribbons etc.) in which the said tie rods are suspended in a constant horizontal or approximately horizontal position, the bearing-line being regulated by a regulator wheel of known construction (placed on the machine) and the electric line by one or more regulator wheels placed above the bearing-line on a mast (scaffolding, pole etc.) erected on the machine.

6. An electric aerial conductor to an electrically driven automobile machine, a bearing-line, independently extended from a mast suspended on the field to the machine, for the purpose of supporting the said air-line, the bearing-line being fastened or suspended on the machine lower than the air-line, devices for connecting the line at one or more points, so called points of junction to the bearing-line, the said devices consisting of hangers in which tie elements connecting the divisions of the line are suspended, the bearing line and the electric line being detachable in parts which can be gradually removed as the work proceeds, the part nearest the machine consisting of easily coiled material (ribbon, wire), the other parts of solid, comparatively inflexible metal.

In testimony whereof, I have signed my name to this specification in the presence of two subscribing witnesses.

HJALMAR S. CASSEL.

Witnesses:
ERNST NAIDLINDT,
HANS PETTERSSON.